(12) United States Patent
Marshall et al.

(10) Patent No.: US 7,385,586 B2
(45) Date of Patent: *Jun. 10, 2008

(54) SYSTEMS AND METHODS FOR PRESENTING AN INTERACTIVE USER INTERFACE

(75) Inventors: Connie T Marshall, Muskogee, OK (US); Thomas R Lemmons, Sand Springs, OK (US); Donald W Allison, Tulsa, OK (US)

(73) Assignee: United Video Properties, Inc., Los Angeles, CA (US)

( * ) Notice: Subject to any disclaimer, the term of this patent is extended or adjusted under 35 U.S.C. 154(b) by 1133 days.

This patent is subject to a terminal disclaimer.

(21) Appl. No.: 10/359,034

(22) Filed: Feb. 3, 2003

(65) Prior Publication Data

US 2004/0045024 A1    Mar. 4, 2004

Related U.S. Application Data

(63) Continuation of application No. 09/515,997, filed on Feb. 29, 2000, now Pat. No. 6,542,169, which is a continuation of application No. 09/227,481, filed on Jan. 7, 1999, now Pat. No. 6,072,460, which is a continuation of application No. 08/763,615, filed on Dec. 11, 1996, now Pat. No. 5,892,498, which is a continuation of application No. 08/225,246, filed on Apr. 8, 1994, now abandoned.

(51) Int. Cl.
*G09G 5/00* (2006.01)

(52) U.S. Cl. ........................ 345/156; 348/564; 725/39

(58) Field of Classification Search ........ 345/156–158; 348/563–565, 731, 734; 725/37–41, 61; 715/700, 716, 781
See application file for complete search history.

(56) References Cited

U.S. PATENT DOCUMENTS 4,203,130 A    5/1980    Doumit et al. .................. 358/1

(Continued)

FOREIGN PATENT DOCUMENTS

GB    2 232 031 A    11/1990

(Continued)

OTHER PUBLICATIONS

CableData brochure, "A New Approach To Addressability" (undated).

(Continued)

*Primary Examiner*—Regina Liang
(74) *Attorney, Agent, or Firm*—Brian E. Mack; Ropes & Gray LLP

(57) ABSTRACT

A system interactively controlled by a TV viewer remote control transmitter displays portions of a scroll program guide on the. Viewer's display screen. A tuner receives TV radio frequency or optical transmission signals in a plurality of cable channels and passes a viewer usable signal to a signal combiner. A computer receives control signals from the TV viewer remote control transmitter. It controls the tuner to pass the viewer usable signal in response to one of the control signals. It receives and stores a scroll input picture image signal containing local program guide data and generates a scroll output picture image signal consisting of at least a portion of the scroll input picture image signal.

26 Claims, 5 Drawing Sheets

U.S. PATENT DOCUMENTS

| | | | |
|---|---|---|---|
| 4,488,179 A | 12/1984 | Krüger et al. | 358/181 |
| 4,691,351 A | 9/1987 | Hayashi et al. | 380/10 |
| 4,706,121 A | 11/1987 | Young | 358/142 |
| 4,714,919 A | 12/1987 | Foster | 340/726 |
| 4,751,578 A | 6/1988 | Reiter et al. | 358/183 |
| 4,787,063 A | 11/1988 | Muguet | 364/900 |
| 4,899,139 A | 2/1990 | Ishimochi et al. | 340/721 |
| 4,942,391 A | 7/1990 | Kikuta | 340/745 |
| 4,963,994 A | 10/1990 | Levine | 358/335 |
| 4,977,455 A | 12/1990 | Young | 358/142 |
| 5,038,211 A | 8/1991 | Hallenbeck | 358/142 |
| 5,151,789 A | 9/1992 | Young | 358/194.1 |
| 5,172,413 A | 12/1992 | Bradley et al. | 380/20 |
| 5,210,611 A | 5/1993 | Yee et al. | 358/191.1 |
| 5,253,066 A | 10/1993 | Vogel | 358/188 |
| 5,285,278 A | 2/1994 | Holman | 358/142 |
| 5,353,121 A | 10/1994 | Young et al. | 348/563 |
| 5,374,942 A | 12/1994 | Gilligan et al. | 345/157 |
| 5,404,393 A | 4/1995 | Remillard | 379/96 |
| 5,412,720 A | 5/1995 | Hoarty | 380/15 |
| 5,465,385 A | 11/1995 | Ohga et al. | 455/6.1 |
| 5,479,268 A | 12/1995 | Young et al. | 358/335 |
| 5,600,364 A | 2/1997 | Hendricks et al. | 348/1 |
| 5,621,456 A | 4/1997 | Florin et al. | 348/7 |
| 5,659,350 A | 8/1997 | Hendricks et al. | 348/6 |
| 5,734,853 A | 3/1998 | Hendricks et al. | 395/352 |
| 5,798,785 A | 8/1998 | Hendricks et al. | 348/1 |
| 5,892,498 A | 4/1999 | Marshall et al. | 345/123 |
| 6,072,460 A | 6/2000 | Marshall et al. | 345/113 |
| 6,331,877 B1 | 12/2001 | Bennington et al. | 348/731 |
| 6,542,169 B1 | 4/2003 | Marshall et al. | 345/781 |

FOREIGN PATENT DOCUMENTS

| | | |
|---|---|---|
| GB | 2 264 409 A | 8/1993 |
| JP | 60-61935 | 4/1985 |
| JP | 4-335395 | 11/1992 |
| WO | WO 86/01359 | 2/1986 |
| WO | WO 91/05436 | 4/1991 |
| WO | WO 95/01057 | 1/1995 |

OTHER PUBLICATIONS

"Addressable Converters: A New Development at CableData," Via Cable, vol. 1, No. 12 (Dec. 1981).

Vito Brugliera, "Digital On-Screen Display—A New Technology for the Consumer Interface," Symposium Record Cable Sessions, 18th International Television Symposium and Technical Exhibition, Montreux, Switzerland Jun. 10-15, 1993, pp. 572-586 (Jun. 11, 1993).

SYSTEMS AND METHODS FOR PRESENTING AN INTERACTIVE USER INTERFACE

CROSS REFERENCE TO RELATED APPLICATIONS

This is a continuation of U.S. application Ser. No. 09/515,997, filed Feb. 29, 2000, now U.S. Pat. No. 6,542,169 which is a continuation of U.S. application Ser. No. 09/227,481, filed Jan. 7, 1999, now U.S. Pat. No. 6,072,460, which is a continuation of U.S. application Ser. No. 08/763,615, filed Dec. 11, 1996, now U.S. Pat. No. 5,892,498, which is a continuation of U.S. application Ser. No. 08/225,246, filed Apr. 8, 1994, now abandoned.

BACKGROUND OF THE INVENTION

This invention relates generally to interactive video communications and more particularly concerns viewer controlled channel programming guide displays.

Channel programming guide information is presently displayed to the home TV viewer in a non-interactive scroll. When the home viewer selects the channel programming guide display, the display is viewed as it is transmitted from the cable network. Consequently, the viewer may have to wait for almost the entire running time of the scroll for a desired segment of the scroll to be displayed on the viewer's screen. Furthermore, the program information on the scroll is changed at discrete time intervals selected by the cable provider. Consequently, only the programming information included in the discrete time interval of the transmitted scroll can be observed by the home viewer. Later programming information will become available to the viewer only when that programming information comes into the particular discrete time interval selected for transmission by the cable provider. In other words, the viewer has no alternative but to wait for the scroll to display the desired programming time slot and, when it is displayed, can view it only for as long as that scroll segment remains on the screen during its normal running time. Any distraction at this juncture starts a new waiting period. It is, therefore, an object of this invention to provide a process and in-home scrolling hardware by which a home viewer may interactively control a channel programming guide. Another object of this invention is to provide a process and in-home scrolling hardware in which the scroll can be stopped by the home viewer. Another object of this invention is to provide a process and in-home scrolling hardware by which a home viewer may forward scroll the channel programming guide. Another object of this invention is to provide a process and in-home scrolling hardware by which a home viewer may reverse scroll the channel program guide. Another object of this invention is to provide a process and in-home scrolling hardware by which a home viewer may select a discrete time interval of channel program guide information from a plurality of discrete time intervals of such information.

SUMMARY OF THE INVENTION

In accordance with the invention, a system interactively controlled by a TV viewer remote control transmitter displays portions of a scroll program guide on the viewer's display screen. A tuner receives TV radio frequency or optical transmission signals in a plurality of cable channels and passes a viewer usable signal of a selected one of the channels to a signal combiner. A computer receives any of a plurality of control signals from the TV viewer remote control transmitter. It also controls the tuner to pass the viewer usable signal in response to one of the control signals from the TV viewer remote control transmitter. It also receives and stores a scroll input picture image signal containing local program guide data and generates a scroll output picture image signal consisting of at least a portion of the scroll input picture image signal. The signal combiner combines the viewer usable signal from the tuner with the output picture image signal from the computer to provide a display signal for input to the viewer's display screen. The computer is responsive to a "forward" control signal from the remote to advance the scroll output picture image signal, to a "reverse" control signal from the remote to back up the scroll output picture image signal and to a "stop" control signal from the remote to freeze the scroll output picture image signal. It is also responsive to directional control signals from the remote to reposition a "highlight" background to corresponding program data slots on the scroll grid and to display further program information corresponding to the program of the data slot shown in "highlight". In addition, it is responsive to further directional control signals to redraw the grid to display earlier or later time segment program data than is normally displayed on the viewer's screen.

BRIEF DESCRIPTION OF THE DRAWINGS

Other objects and advantages of the invention will become apparent upon reading the following detailed description and upon reference to the drawings in which.

While the invention will be described in connection with a preferred embodiment and process, it will be understood that it is not intended to limit the invention to that embodiment or process. On the contrary, it is intended to cover all alternatives, modifications and equivalents as may be included within the spirit and scope of the invention as defined by the appended claims.

DETAILED DESCRIPTION OF THE INVENTION

Figure 1:
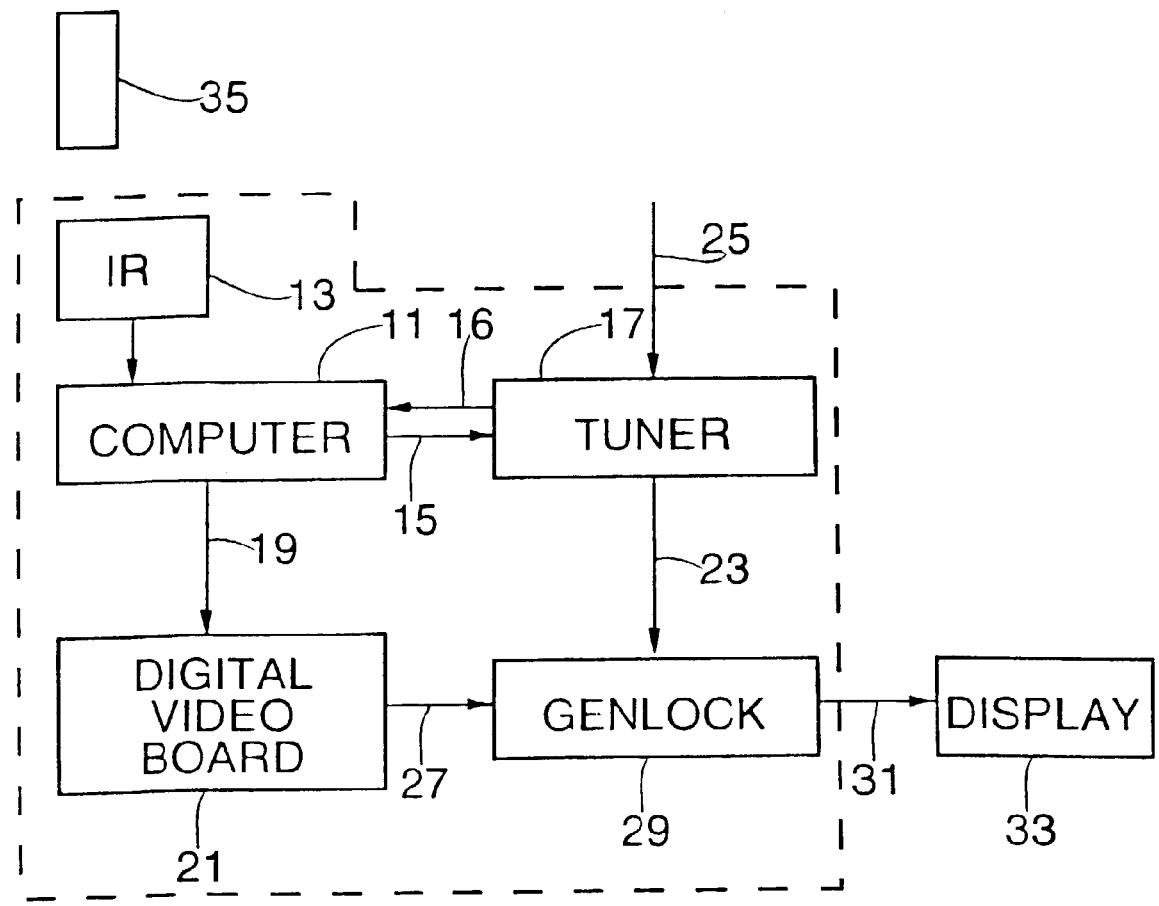
FIG. 1 is a block diagram illustrating a preferred embodiment of the hardware of the interactive scroll program guide.

Turning first to FIG. 1, the components of the interactive scroll program guide are illustrated. A computer 11 having a command information receiver, preferably an infrared or radio frequency receiver 13, provides a control signal 15 to a tuner 17 and a picture image signal 19 to a digital video board 21. The tuner 17 converts or demodulates radio frequencies or optical transmission to a signal usable by the viewer to output a signal 23 selected from a plurality of signals 25 input to the tuner 17 from the cable source (not shown), typically frequency division multiplexed video, audio and data signals transmitted via a coaxial cable, over-the-air radio frequencies or fiber optics. The digital video board 21 converts digital data into a video signal. The tuner output signal 23 is superimposed on or combined with a scroll information picture image signal 27 from the digital video board 21 in a genlock signal combiner or overlayer 29. The combined scroll and TV picture signal 31 is then displayed on a video signal display device such as the display screen 33 of the viewer's television. The viewer sends commands to the receiver 13 to control the operation of the computer 11 by the use of a remote control transmitter, preferably an infrared or radio frequency transmitter 35. The computer 11 is based on a microprocessor and may utilize random access (RAM) and/or read only (ROM) memory. The software necessary to operate the microprocessor may be embedded in the device or downloaded via the cable system to the device.

Figure 2:
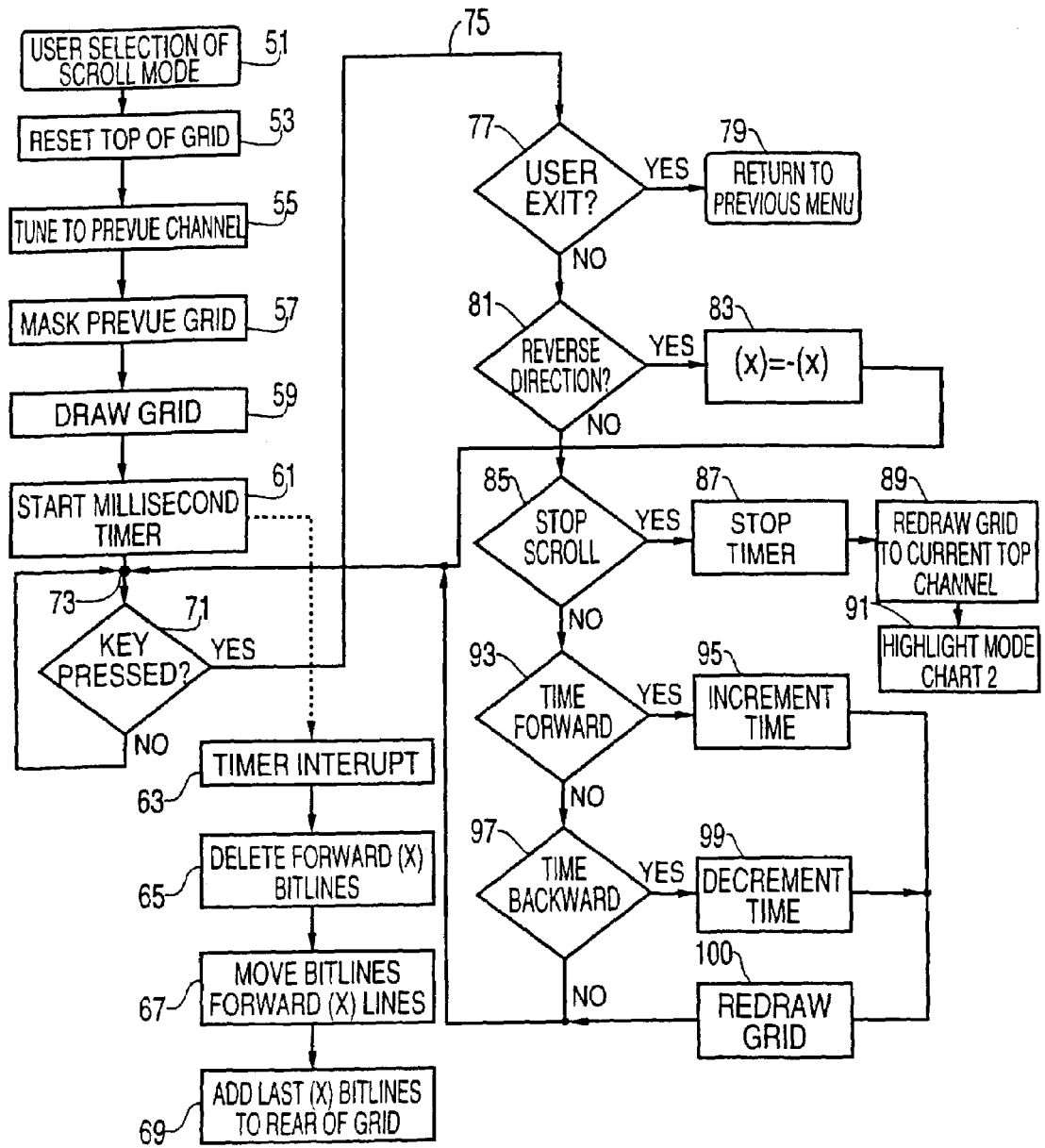
FIG. 2 is a flow chart illustrating the basic process and options of the interactive scroll program guide.

The above described interactive scroll program guide components operate in response to the control of the computer 11. As shown in FIG. 2, when the home viewer elects to view the scroll mode 51 by operation of the viewer remote control 35, the computer 11 automatically resets to the top of the grid 53 so as to set the display of the scroll at its beginning point for viewing. The computer 11 then provides a control signal 15 to the tuner 17 to select the channel designated by the home viewer's cable system as its programming data channel 55. The computer 11 further causes the portion of the display 33 on which the program data is to appear to be masked 57. With the existing program guide area of the display masked, the computer 11 causes the picture image signal 19 to be generated, thus causing the program guide grid to be drawn 59. With the grid drawn, the computer 11 further initiates operation of a millisecond timer 61 which causes the picture image signal 19 to be fired in millisecond intervals. The operation of the millisecond timer 61 adjusts the speed of the scroll by changing the number of lines of pixels moved at one time. When a timer interrupt 63 permits a change, the software scrolls the grid by causing deletion of the forward lines 65, copying of the rest of the lines forward to overlay the deleted lines 67 and addition of new lines to the rear of the grid 69. This is repeated every few milliseconds so that a smooth scroll is accomplished.

Each text line is generated when the first pixel line in that text line is needed. This text line is stored in a memory buffer until all of its pixel lines are used and then is replaced by the next text line. This allows the pixels to be used without having to regenerate them each time the scroll is updated. When the last text line is reached, the first text line is generated and added onto the screen in a circular fashion. Thus, the scroll becomes a continuous loop. Typically, the scroll will be changed in one to three pixel line increments and preferably in two pixel line increments for a display having an approximately two hundred pixel line scroll. The current text line is remembered and, if the viewer stops the grid, the current text line is positioned at the top of the grid and the scroll timer halted. Looking at FIG. 4, the viewer display screen 33 displays, on approximately its top half, the display defined by the viewer usable signal 23 passed by the tuner 17 (display not shown). It also displays, on approximately the bottom half, a first horizontal data slot divided into vertical columns indicating the proper date 201 and second the program times, as shown, in two half hour increments 203 and 205. Second, third and fourth horizontal data slots are divided into a vertical column showing sequential channel identifications 207, 209 and 211 and into other vertical columns showing program identification data for corresponding channels and times 213, 215 and 217. As shown, the scroll has advanced to illustrate data for channels 15 MAX on slots 207 and 213, 16 ENCORE in slots 209 and 215 and 17 TJC in slots 211 and 217. As scrolling continues the channel 15 MAX data will be removed, the channel 16 ENCORE data and 17 TJC data will move up to slots 207 and 213 and 209 and 215, respectively, channel data will be presented in the lower slots 211 and 217. When the scroll is reversed, the above described process is executed in opposite fashion. That is, the rear bit lines are deleted, the bit lines are moved rearwardly and the last bit lines are added to the front of the grid. Looking at FIG. 5, the scroll of FIG. 4 has been reversed so that the channel 17 TJC and channel 16 ENCORE data have been removed, the channel 15 MAX data has moved down to the lower slots 211 and 217 and channel 14 HBO and 13 PREV data have been added to the slots 209 and 215 and 207 and 213, respectively.

In one preferred operating mode of the invention, the "back arrow" key of the remote would be used for reverse scrolling operation, the "forward arrow" key of the remote would be used for forward scrolling, the "enter" key of the remote would be used to stop the scroll, the "right arrow" key of the remote would be used to forward the time slot, the "left arrow" key of the remote would be used to back up the time slot, the "stop" key of the remote would be used to exit and the "power" key of the remote would be used as an off switch.

The computer routine will inquire as to whether one of the computer keys used in the routine has been pressed 71. If the answer is "NO", the routine returns to point 73 to maintain the inquiry. If the answer is "YES", the routine continues via another route 75. In the "YES" route 75, the next inquiry may be whether the viewer has selected a user exit 77 by pressing the "stop" key. If the answer to this inquiry is "YES", the routine returns to the previous menu 79. If the answer to this inquiry is "NO", the routine may determine if the viewer has selected a scroll reverse direction 81 by pressing the "back arrow" key. If the answer to this inquiry is "YES", the routine continues through a reversal stage 83 which shifts the pixel rotation as above described and then returns to the routine at point 73 to the key pressed inquiry 71. If the response to the reverse direction inquiry 81 is "NO", the routine may next inquire whether the viewer has chosen to stop the scroll 85 by pressing the "enter key". If the response to this inquiry is "YES", the routine is routed to stop the timer 87 so as to cease the sequence of pixel line rotation. At this point, the routine further directs that the grid be redrawn to the current top channel 89 so as to index the grid to display complete programming data for the top channel displayed on the grid. With the grid thus redrawn, the routine may place the system into a highlight mode 91 to be hereafter explained. In any event, the redrawn grid will be displayed until the viewer selects a new mode of operation.

Figure 4:
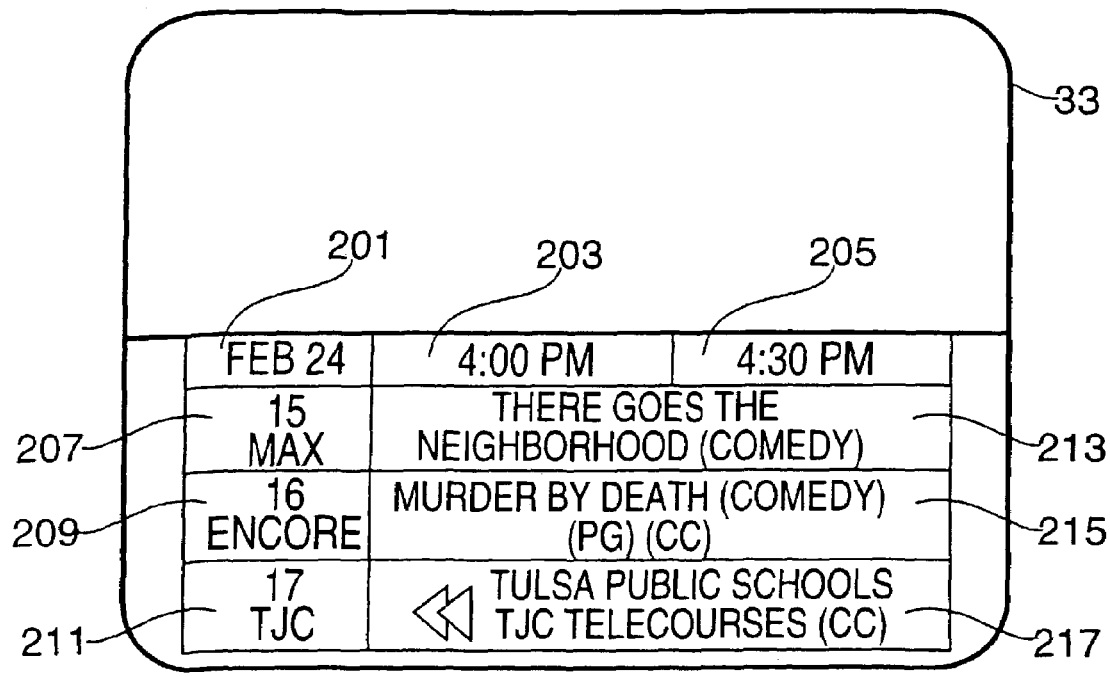
FIG. 4 is a representation of an interactive scroll program guide display for a selected date and time.
Figure 5:
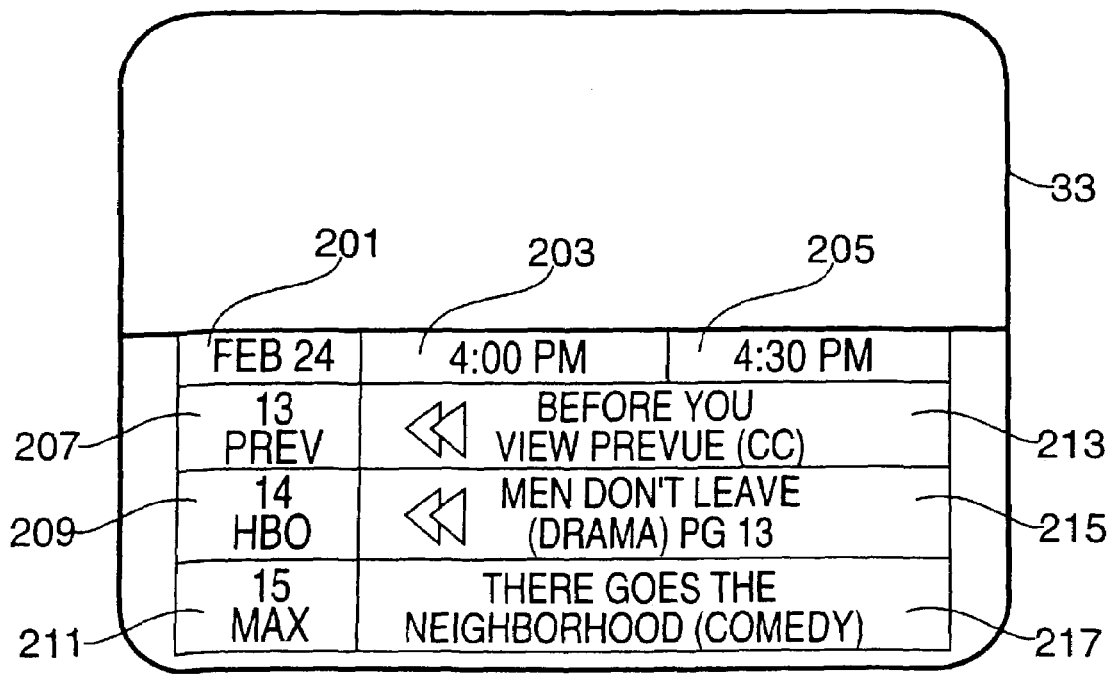
FIG. 5 is a representation of the interactive scroll program guide display of FIG. 4 in a "scrolled down" condition relative to FIG. 4.

The user may also select a different programming time slot, thus changing the program information displayed. That is, a different picture image signal 19 corresponding to the time slot selected by the viewer will be generated by the computer 11 for display. The entire grid will thus be redrawn for the time slot chosen. Thus, if the response to the stop the scroll inquiry 85 is "NO", the routine may continue to a time forward inquiry 93. At this point in the routine, the screen display continues as shown in FIG. 4, with the channel identification and program identification slots scrolling in a normal forward sequence as hereinbefore described. If the viewer has pressed the time forward or "right arrow" key, a "YES" response to the time forward inquiry 93 will cause the time slots to be advanced by a predetermined increment time 95 and the grid redrawn 100 so that the scroll will display information relevant to a different time slot. The time slots can be arranged in any predetermined increments, the increments normally being chosen in one hour segments. With the grid redrawn, the routine returns through point 73 to the key pressed inquiry 71 for a repeat of the routine. If the answer to the time forward inquiry 93 is "NO", the routine continues on to a time backward inquiry 97. If the time backward or "left arrow" key has been depressed, a "YES" response will cause the time slots to be backed up by a predetermined decrement time 99 and the grid redrawn 100 to the next earlier time segment in opposite fashion as for the increment time 95 portion of the routine. With the grid redrawn 100, the routine then returns through point 73 to the key pressed inquiry 71 to be repeated. If the answer to the time backward inquiry 97 is "NO", the routine returns through the point 73 to the key pressed inquiry 71 to again continue the routine.

Figure 3:
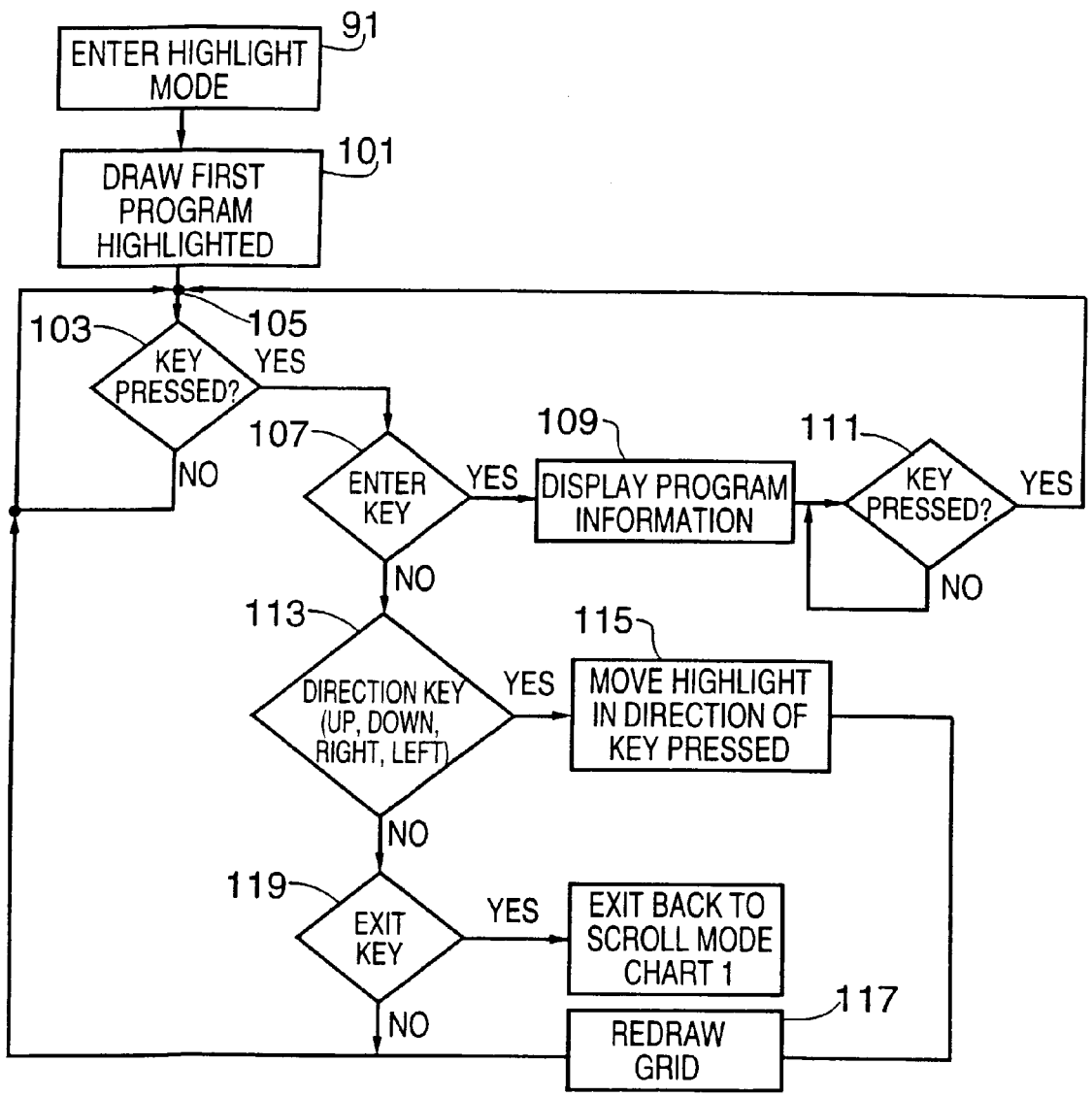
FIG. 3 is a flow chart illustrating further options of the interactive scroll program guide.
Figure 6:
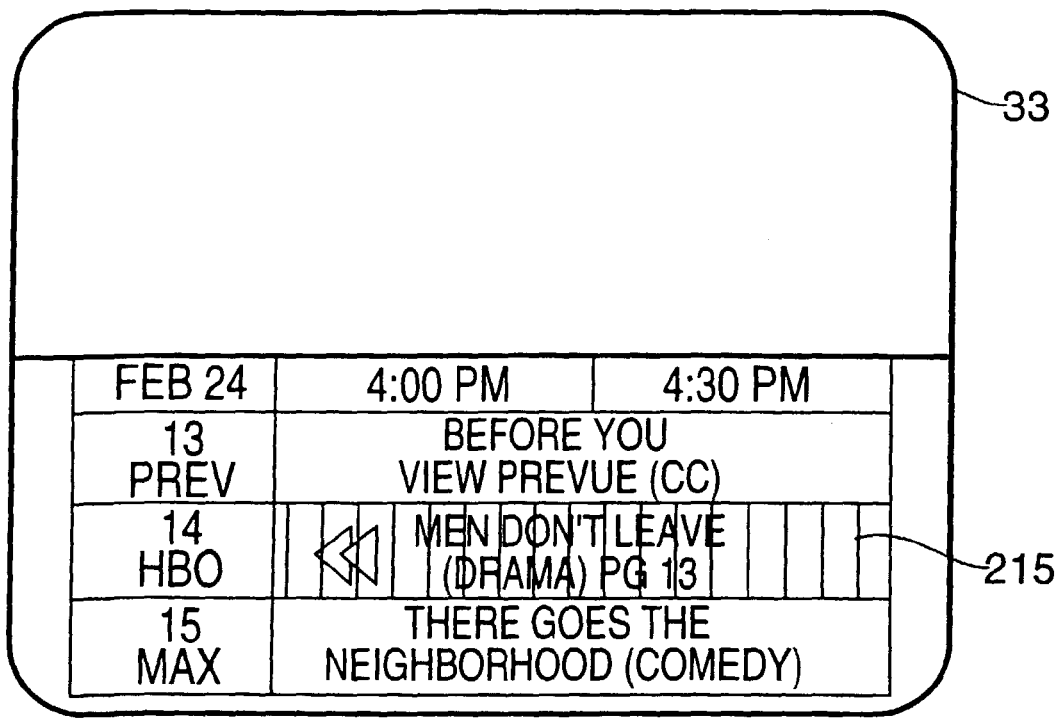
FIG. 6 is a representation of the interactive scroll program guide display of FIG. 5 in a "highlighted" condition relative to FIG. 5.
Figure 7:
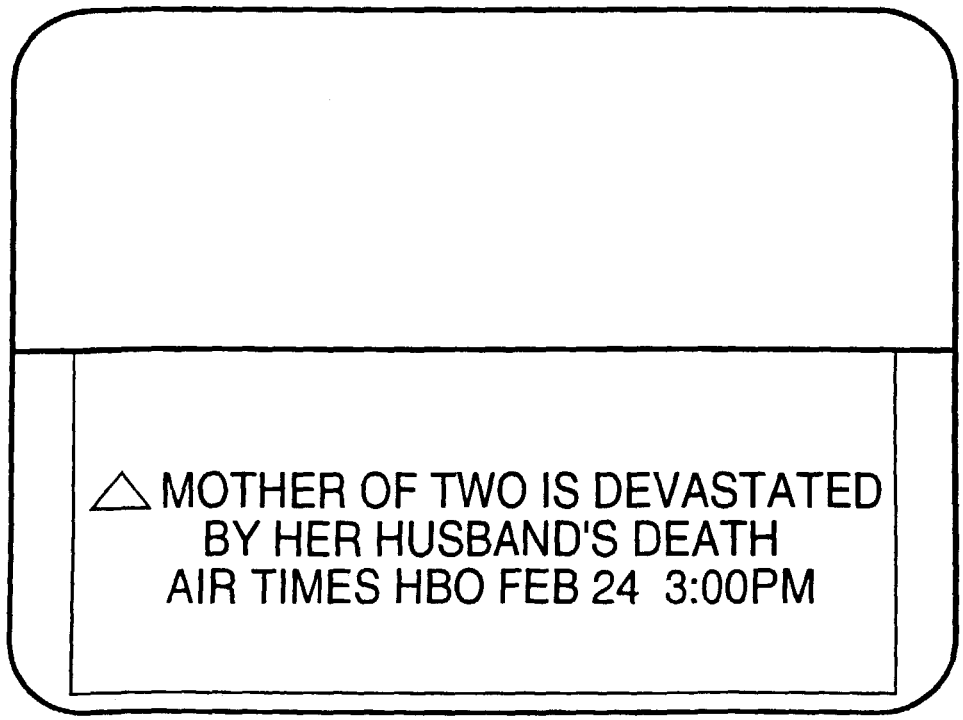
FIG. 7 is a representation of the interactive scroll program guide display showing selected information describing the program highlighted in FIG. 6.

Turning now to FIG. 3, another routine option is presented beginning with the highlight mode 91 earlier discussed in relation to FIG. 2. If the viewer has proceeded through the stop scroll inquiry 85 with a "YES" response, the top program identification slot 213 will be automatically drawn highlighted 101 by a background color different than the remainder of the grid. At this point, the viewer may select one of several keys. For example, the "enter" key would indicate a command to display the first program information highlighted. Alternatively, the "up arrow", "down arrow", "right arrow" and "left arrow" would indicate directional movements of the highlight condition in reference to the program information then highlighted. For example, in FIG. 6, the viewer has opted to "down arrow" the highlight to the second program identification slot 215. Finally, the "exit" key would be used to indicate a desire to exit the highlight routine of the program. If, at a key pressed inquiry 103, the answer is "NO", the routine returns through point 105 to maintain the key pressed inquiry 103. If, however, the answer is "YES", the routine proceeds to an "enter key" inquiry 107. If the answer to this inquiry is "YES", the routine continues to the display program information stage 109 so that specific information regarding the highlighted program will be displayed on the screen as shown in FIG. 7. The program would then continue to another key pressed inquiry 111. If the answer to this inquiry is "YES", this will indicate the desire of the viewer to exit the display of that particular selected information and the routine is returned through point 105 to the earlier key pressed inquiry 103 to continue the highlight routine. If the answer to the key pressed inquiry 111 is "NO", the routine returns to the same key pressed inquiry 111 to maintain the display presently existing for the viewer. If the response to the enter key inquiry 107 is "NO", the routine proceeds to a direction key inquiry 113. If the answer to this inquiry is "YES", the highlight will move in the direction of the key pressed 115 as above described and the grid will be redrawn 117 to show the highlight moved. With the highlight so moved, the routine will continue through point 105 to the key pressed inquiry 103 for continuance of the highlight routine. If the response to the direction key inquiry 113 is "NO", the routine will proceed to an exit key inquiry 119. If the answer to the exit key inquiry 119 is "YES", the routine will exit back to the user selection or scroll mode 51 shown in FIG. 2. If the answer to the exit key inquiry 119 is "NO", the routine will continue through point 105 to the key pressed inquiry 103 for continuation of the highlight routine.

Thus, each individual viewer will be provided with an interactive scroll program guide which can be programmed at intervals by the cable provider to provide programming data for a multiplicity of viewing time segments. The home viewer can in turn interactively determine whether the scroll of data should be forwarded, reversed, stopped or changed as to the time displayed. In addition, the viewer may select to highlight certain data or to display additional information relevant to a selected program.

Thus, it is apparent that there has been provided, in accordance with the invention, an interactive scroll program guide that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A method for invoking an interactive user interface, comprising:
   receiving a user interface invocation command from a user;
   invoking the interactive user interface in response to receipt of the user interface invocation command so that a user interface display is presented to the user;
   tuning to a television channel in response to the user invoking the interactive user interface;
   displaying at least a portion of the television channel;
   causing the interactive user interface to be displayed as an automatically scrolling grid containing a plurality of time slots;
   receiving a selection of a programming time slot; and
   updating the automatically scrolling grid to contain the selected programming time slot.

2. The method of claim 1, wherein the television channel comprises programming data channel videos, the method further comprising:
   causing the interactive user interface to be displayed as an automatically scrolling grid on one portion of a display and the programming data channel videos to be displayed on another portion of the display.

3. The method of claim 1 further comprising enabling the user to adjust how quickly the automatically scrolling grid is scrolling.

4. The method of claim 1, wherein the television program channel comprises programming data channel data, the method further comprising:
   causing the programming data channel data to be masked when the interactive user interface and the at least a portion of the television channel are displayed.

5. The method of claim 1 further comprising enabling the user to move the grid backward by at least one of the time slots.

6. The method of claim 1 further comprising enabling the user to move the grid forward by at least one of the time slots.

7. The method of claim 1 further comprising enabling the user to control in which direction the grid scrolls.

8. The method of claim 1 further comprising enabling the user to stop the grid from scrolling.

9. The method of claim 1 further comprising:
   enabling the user to select an item of program guide data in the interactive user interface; and causing additional information on the selected item to be displayed.

10. The method of claim 1 further comprising enabling a user to enter a highlight mode in which a portion of the grid corresponding to a selected television program is highlighted.

11. The method of claim 10 further comprising causing information related to the selected television program to be displayed.

12. The method of claim 10 further comprising enabling the user to move the highlighted portion of the grid.

13. The method of claim 10 further comprising enabling the user to exit the highlight mode.

14. A system for invoking an interactive user interface, comprising:
- a user input device;
- a tuner;
- a signal combiner; and
- a computer, wherein the computer is configured to:
    - receive a user interface invocation command from the user input device;
    - invoke the interactive user interface in response to receiving the user interface invocation command;
    - provide a control signal to the tuner to tune to a television channel in response to invoking the interactive user interface;
    - cause the signal combiner to generate a display signal that causes at least a portion of the television channel to be displayed and causes the interactive user interface to be displayed as an automatically scrolling grid containing a plurality of time slots;
    - receive a user selection of a programming time slot from the user input device; and
    - update the automatically scrolling grid to contain the selected programming time slot.

15. The system of claim 14, wherein the television channel comprises programming data channel videos, and wherein the computer is further configured to cause the signal combiner to generate a display signal that causes the interactive user interface to be displayed as an automatically scrolling grid on one portion of a display and the programming data channel videos to be displayed on another portion of the display.

16. The system of claim 14, wherein the computer is further configured to enable a user to adjust the scroll speed of the automatically scrolling grid using the user input device.

17. The system of claim 14, wherein the television program channel comprises programming data channel data, and wherein the computer is further configured to cause the programming data channel data to be masked when the interactive user interface and the at least a portion of the television channel are displayed.

18. The system of claim 14, wherein the computer is further configured to enable a user to move the grid backward by at least one of the time slots using the user input device.

19. The system of claim 14, wherein the computer is further configured to enable a user to move the grid forward by at least one of the time slots using the user input device.

20. The system of claim 14, wherein the computer is further configured to enable a user to control in which direction the grid scrolls using the user input device.

21. The system of claim 14, wherein the computer is further configured to enable a user to stop the grid from scrolling using the user input device.

22. The system of claim 14, wherein the computer is further configured to:
- receive a user selection of an item of program guide data in the interactive user interface from the user input device; and
- cause the signal combiner to generate a display signal that causes additional information on the selected item to be displayed.

23. The system of claim 14, wherein the computer is further configured to enable a user to enter a highlight mode using the user input device in which a portion of the grid corresponding to a selected television program is highlighted.

24. The system of claim 23, wherein the computer is further configured to cause the signal combiner to generate a display signal that causes information related to the selected television program to be displayed.

25. The system of claim 23, wherein the computer is further configured to enable a user to move the highlighted portion of the grid using the user input device.

26. The system of claim 23, wherein the computer is further configured to enable a user to exit the highlight mode using the user input device.

* * * * *